Patented Dec. 10, 1946

UNITED STATES PATENT OFFICE 2,412,214

SOLVENT- AND FREEZE-RESISTANT SYNTHETIC RUBBER AND PROCESS OF PREPARING SAME

Anthony H. Gleason, Westfield, N. J., assignor to Standard Oil Development Company, a corporation of Delaware No Drawing. Application May 19, 1943,
Serial No. 487,617

10 Claims. (Cl. 260—84.5)

The present invention pertains to the production of copolymers and particularly of copolymers of diolefins and a nitrile of a low molecular weight unsaturated acid of improved properties.

Copolymers of diolefins with a variety of unsaturated materials have been prepared for some time. Depending upon the reactants, the proportions in which the several reactants are used and the conditions applied during polymerization, products are obtained varying from soft, plastic, rubber-like materials to hard, resinous products. Several of the synthetic rubber-like materials have proven to be of very great value for certain specialty uses because of their resistance to solvents. One of the outstanding members of this class is the copolymer of a diolefin such as butadiene or isoprene with a nitrile of a low molecular unsaturated acid such as acrylonitrile or methacrylonitrile. The most common member of this class obtained by copolymerizing 74 parts by weight of butadiene and 26 parts of acrylonitrile in aqueous emulsion shows an increase in volume of about 34% when immersed in an 85/15 kerosene-benzol mixture for 48 hours. The solvent resistance of this copolymer can be increased quite substantially by increasing the ratio of nitrile to butadiene, the copolymer of 65% butadiene and 35% of acrylonitrile showing an increase in volume of 20% and the copolymer of 59% butadiene and 41% acrylonitrile showing an increase in volume of only 9% when immersed in 85/15 kerosene-benzol mixtures for 48 hours. In view of this high solvent resistance, these copolymers are in demand for use in motor fuel hoses, fuel containers and the like.

In the manufacture of bullet-proof fuel tanks, it is highly desirable that at least one of the rubbery layers of the tank lining possess the properties of high resistance to the action of solvents such as aviation gasoline, combined with the ability to resist the tearing action of a projectile at very low temperatures. While the solvent resistance of butadiene-acrylonitrile polymers of higher nitrile ratios would seem to make them particularly suitable for this purpose, it has been found that they are unsatisfactory because of their low freeze resistance or brittleness at low temperatures. In the case of butadiene-acrylonitrile copolymers, increasing the proportion of nitrile in the rubber improves the solvent resistance but decreases the freeze resistance so that above about 30% of nitrile a bullet produces large holes with radiating cracks when fired through sheets of such copolymers which are cooled to about −20° C.

It is the object of the present invention to provide the art with a novel copolymer having extremely high solvent resistance.

It is also an object of this invention to provide the art with a copolymer having high solvent resistance and also high freeze resistance.

It is a further object of this invention to provide the art with a novel rubbery copolymer which is highly resistant to the action of solvents, particularly aviation gasoline, and which is capable of resisting the tearing action of projectiles at low temperatures.

These and other objects will appear more clearly from the detailed description and claims which follow.

It has now been found that a synthetic rubber-like material which not only possesses extremely high solvent resistance but also the ability to resist the tearing action of projectiles at low temperatures can be produced by incorporating about 10 to 20% of a chlorinated diolefin into a diolefin-acrylonitrile type emulsion polymer while maintaining the nitrile content below about 30% and preferably at about 25%. The nitrile content of the interpolymers in accordance with the present invention may vary between about 10 to 30% and the diolefin hydrocarbon may constitute from about 50 to 80% of the interpolymer.

The diolefin hydrocarbons that may be used in accordance with the present invention include such compounds as butadiene, isoprene, dimethyl butadiene and piperylene.

The nitriles which may be used correspond to the general formula

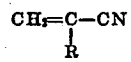

wherein R stands for hydrogen or a lower alkyl group. The preferred nitriles are acrylonitrile and methacrylonitrile.

The preferred chlorinated diolefin which I use is chloroprene, or 2-chlorobutadiene-1,3. Other chlorinated diolefins that may be used are the 3-methyl derivative and the 3,4-dimethyl compound

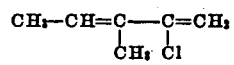

Alpha chloroprene, or 1-chlorobutadiene-1,3 might also be used but is not very satisfactory because the chlorine in the resulting product lacks the desired stability since it is no longer adjacent to a double bond.

The general procedure for preparing the polymers of the invention is to emulsify one part of a mixture of the materials to be copolymerized in about two parts of an aqueous solution of soap or other emulsifying agent, add a catalyst and a modifying agent, and heat with mild agitation until the reaction has progressed to the desired point. The crude latex is stabilized by the addition of an antioxidant and coagulated by the addition of brine, alcohol, or acetic acid. The product is then washed and dried on the mill in the usual manner. As already mentioned, the reactants consist of a diolefin hydrocarbon, a chlorinated diolefin and a nitrile of an unsaturated acid such as acrylic or methacrylic acid. As emulsifiers, the alkali metal soaps of fatty acids, unsaturated fatty acids, higher alkyl sulfates, alkylated aryl sulfonates, and the like may be used. Acid-type emulsifiers such as the higher alkyl amine salts of mineral acids may also be employed. Generally, soap concentrations of 1.5 to 5.0% are sufficient to give stable emulsions. The reaction is catalyzed and accelerated by oxygen which may be present in the gaseous form or preferably in a compound from which it is slowly liberated, such as hydrogen peroxide, the per salts, etc. Modifying agents are frequently used for the purpose of obtaining more plastic polymers, but they may also act as catalysts or accelerators for the reaction. Tertiary amines, mercaptans, and polysulfides are among the compounds especially active in this respect. By "modifying agent" is meant one which alters the properties of the product with regard to molecular weight, plasticity, etc. Both catalysts and modifiers are generally employed in concentrations of 0.1 to 1.0%, based on the reactants. The time and temperature of the polymerization are dependent on the nature of the reactants and the accelerators and modifiers employed; but for diolefin-acrylonitrile mixtures, 10-20 hours at 35° C. is usually sufficient to obtain a conversion of 70-80%. Conversions in this range appear to be the most desirable from the standpoint of product quality.

The following examples are illustrative of the preparation of copolymers in accordance with the present invention. It will be understood, however, that this invention is not limited to these examples.

*Example 1*

One hundred thirty grams of butadiene, 20 grams of 2-chlorobutadiene-1,3, and 50 grams of acrylonitrile were mixed and emulsified in 400 grams of an aqueous 2½% solution of sodium oleate. Six-tenths of a gram of potassium persulfate (0.15% on water) and 1.0 gram of Lorol mercaptan (0.5% on reactants) were added and the mixture slowly agitated for sixteen hours at 35° C. Two grams of phenyl beta naphthyl amine was incorporated in the latex, which was subsequently coagulated with brine and alcohol to give 144 grams (71%) of dried rubber. Analysis showed this material to contain 13.6% chloroprene and 24.8% acrylonitrile. When cured for 75 minutes at 287° F. according to the recipe given below, the product had a tensile of 2,000 pounds per square inch at break (470% elongation) and a modulus of 1,315 pounds per square inch.

|  | Parts |
|---|---|
| Pure gum | 100 |
| ZnO | 5 |
| Stearic acid | 0.5 |
| Benzo thiazyl disulfide | 1.0 |
| Sulfur | 1.5 |
| Semi-reinforcing carbon black | 75 |
| Tributoxy ethyl phosphate | 30 |

*Example 2*

A copolymer similar to that of Example 1 was prepared from 30 grams chloroprene, 120 grams butadiene, and 50 grams acrylonitrile. The copolymer was obtained in 78% conversion and found to contain 19.4% chloroprene and 24.7% acrylonitrile. Slabs of this material cured according to the above recipe were cooled to −20° C. and −40° C. and shot with a forty-five calibre revolver. A Buna N copolymer containing 26% acrylonitrile and 74% butadiene was also compounded according to the above recipe, and slabs thereof were cured, cooled to −20° C. and −40° C. and shot with said forty-five calibre revolver. In each case, the hole in the tripolymer slab was smaller than the hole in the Buna N slab shot at the same temperature. In addition, the holes in the tripolymer slabs were free from the highly undesirable radiating cracks that were present around the holes in the Buna N slab. A comparison of the other properties which are of interest in synthetic rubber used in the construction of bullet-proof fuel tanks are listed below.

|  | Tripolymer | Buna N |
|---|---|---|
| Composition | 19.4% chloroprene. 24.7% acrylonitrile. 55.9% butadiene. | 26% acrylonitrile. 74% butadiene. |

|  | Tripolymer | Buna N |
|---|---|---|
| Freeze res. (Shore hardness at −40°) | 79 | 83 |
| Solvent resistance, percent volume increase in— |  |  |
| Kerosene-benzol 85/25 | 17.9 | 27.0 |
| 40% aromatic fuel | 35.7 | 49.5 |
| Tensile strength, lbs. per sq. in | 1,800 | 1,850 |
| Percent elongation | 400 | 590 |
| Williams plasticity and recovery | 87–9 | 105–2 |

The slightly lowered Shore hardness at −40° C. also tends to confirm the observed results as to size and nature of the bullet holes. The solvent resistance of the tripolymer in both kerosene-benzol mixtures (85/15) and 40% aromatic fuel is considerably improved over the butadiene-acrylonitrile copolymer (76/24), as demonstrated by the lowered volume increase (swell) when exposed to these liquids for four days at room temperature. On the average, the solvent resistance of the tripolymer is equal to that of a butadiene-acrylonitrile copolymer containing between 30–35% acrylonitrile. These higher nitrile copolymers are very readily fractured by bullets at −40°. Thus the incorporation of 15–20% 2-chlorobutadiene-1,3 into butadiene-acrylonitrile copolymers produces a very desirable increase in solvent resistance and at the same time produces a substantial increase in the resistance to fracture by forty-five calibre projectiles at low temperatures.

The foregoing description contains a limited number of embodiments of the present invention, but it will be apparent to those skilled in the art that numerous variations are possible without departing from the purview of the present invention as defined in the following claims.

What I claim and desire to secure by Letters Patent is:

1. The process of preparing a synthetic rubber-like material having high solvent and freeze resistance which comprises polymerizing in aqueous emulsion a mixture of about 50–80 weight percent of a conjugated diolefin hydrocarbon, about 10–30 weight percent of a nitrile corresponding to the general formula

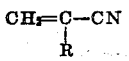

wherein R stands for a member of the group consisting of hydrogen and lower alkyl groups and 10-20 weight percent of a mono-chloro substituted conjugated diolefin.

2. The process of preparing a synthetic rubber-like material having high solvent and freeze resistance which comprises polymerizing in aqueous emulsion a mixture of about 55-65 weight percent of a conjugated diolefin hydrocarbon, about 25 weight percent of a nitrile corresponding to the general formula $$CH_2=C-CN$$
$$\phantom{CH_2=C-}|$$
$$\phantom{CH_2=C-}R$$

wherein R is selected from the group consisting of hydrogen and lower alkyl groups and 10-20 weight percent of a mono-chloro substituted conjugated diolefin.

3. The process as defined in claim 1 wherein the diolefin is butadiene-1,3, the nitrile is acrylonitrile and the chloro substituted diolefin is 2-chlorobutadiene-1,3.

4. The process as defined in claim 2 wherein the diolefin is butadiene-1,3, the nitrile is acrylonitrile and the chloro substituted diolefin is 2-chlorobutadiene-1,3.

5. The process of producing synthetic rubber-like material of high solvent and freeze resistance which comprises polymerizing in aqueous emulsion a mixture of 60 weight percent of butadiene-1,3, 25 weight percent of acrylonitrile and 15 weight percent of 2-chlorobutadiene-1,3.

6. A synthetic rubber-like material having high solvent and freeze resistance which consists of the emulsion copolymerizate of a mixture of about 50-80 weight percent of a conjugated diolefin hydrocarbon, about 10-30 weight percent of a nitrile corresponding to the general formula $$CH_2=C-CN$$
$$\phantom{CH_2=C-}|$$
$$\phantom{CH_2=C-}R$$

wherein R stands for a member of the group consisting of hydrogen and lower alkyl groups and 10-20 weight percent of a mono-chloro substituted conjugated diolefin.

7. A synthetic rubber-like material having high solvent and freeze resistance which consists of the emulsion copolymerizate of a mixture of about 55 to 65 weight percent of a conjugated diolefin hydrocarbon, about 25 weight percent of a nitrile corresponding to the general formula $$CH_2=C-CN$$
$$\phantom{CH_2=C-}|$$
$$\phantom{CH_2=C-}R$$

wherein R is selected from the group consisting of hydrogen and lower alkyl groups and 10-20 weight percent of a mono-chloro substituted conjugated diolefin.

8. A synthetic rubber-like material having high solvent and freeze resistance which consists of the emulsion copolymerizate of a mixture of 50-80 weight percent of butadiene-1,3, 10-30 weight percent of acrylonitrile and 10-20 weight percent of 2-chlorobutadiene-1,3.

9. A synthetic rubber-like material having high solvent and freeze resistance which consists of the emulsion copolymerizate of a mixture of 55-65 weight percent of butadiene-1,3, 25 weight percent of acrylonitrile and 10-20 weight percent of 2-chlorobutadiene-1,3.

10. A synthetic rubber-like material having high solvent and freeze resistance which consists of the emulsion copolymerizate of a mixture of 60 weight percent of butadiene-1,3, 25 weight percent of acrylonitrile and 15 weight percent of 2-chlorobutadiene-1,3.

ANTHONY H. GLEASON.